US006215256B1

United States Patent
Ju

(10) Patent No.: US 6,215,256 B1
(45) Date of Patent: Apr. 10, 2001

(54) HIGH-EFFICIENT ELECTRONIC STABILIZER WITH SINGLE STAGE CONVERSION

(75) Inventor: Yih Shan Ju, Hsinchu (TW)

(73) Assignee: Ambit Microsystems Corporation, Hsinchu (TW)

( * ) Notice: Subject to any disclaimer, the term of this patent is extended or adjusted under 35 U.S.C. 154(b) by 0 days.

(21) Appl. No.: 09/612,003

(22) Filed: Jul. 7, 2000

(51) Int. Cl.$^7$ .................................................. H05B 37/00
(52) U.S. Cl. ............................ 315/307; 315/219; 315/224; 315/278
(58) Field of Search ..................... 315/219, 291, 315/224, 307, 278

(56) References Cited

U.S. PATENT DOCUMENTS 5,747,942 * 5/1998 Ranganath ............................ 315/224

* cited by examiner

Primary Examiner—David Vu
(74) Attorney, Agent, or Firm—Pro-Techtor International Services

(57) ABSTRACT

An electronic stabilizer with single stage conversion includes a push-pull resonant stage, a synchronous pulse width modulation controller, and a converter. The push-pull resonant stage includes a high frequency transformer and transistors to form an alternating voltage-increasing loop that operates under self-activating oscillation, the high frequency transformer including a secondary winding for driving a lamp. The synchronous pulse width modulation controller samples signals from the lamp and feeds back to control a power input for the lamp. The converter includes transistors to form a dynamic resistance that allows current to flow in both directions. The converter includes an input end that is electrically connected to an output end of the synchronous pulse width modulation controller. The converter further includes an output end that is electrically connected in series to the secondary winding of the high frequency transformer and in series connection with the lamp. Only one stage of energy loss occurs in the push-pull resonant stage between the power input and the lamp.

7 Claims, 3 Drawing Sheets

HIGH-EFFICIENT ELECTRONIC STABILIZER WITH SINGLE STAGE CONVERSION

BACKGROUND OF THE INVENTION

1. Field of the Invention

The present invention relates to a high-efficient electronic stabilizer with single stage conversion to solve low efficiency problem of traditional electronic stabilizers.

2. Description of the Related Art

FIGS. 3 and 4 of the drawings illustrates a conventional electronic stabilizer for sun lamps. A high frequency transformer with a high turn ratio and two transistors are combined to form a push-pull resonant stage 50. Sine waves are generated by self-activation and then transformed by the high frequency transformer into high voltage/low current alternating voltage for activating the sun lamp 60. Nevertheless, the current passing through the sun lamp (i.e., the brightness of the sun lamp) cannot be controlled. In front of the push-pull resonant stage 50 a power converter 80 is electrically connected in series to change the duty cycle of the transistors in the power converter 80 via control by a synchronous pulse width modulation controller 70 to adjust the current passing through the sun lamp 60, thereby controlling the brightness of the sun lamp 60.

Nevertheless, it is found that the efficiency of the above-mentioned stabilizer is poor, since the power must pass through the power converter 80 and the push-pull resonant stage 50 before it reaches the sun lamp 60. Namely, there are two stages of energy loss such that the overall efficiency is only about 72% if the energy loss of each stage is about 85%. In addition, the power converter 80 is connected to the main loop in series such that the transistors in the power converter 80 must adopt high power/high current elements, which results in high cost and generates considerable amount of heat. Thus, heat dissipation problem occurs.

SUMMARY OF THE INVENTION

It is the primary object of the present invention to provide a high-efficient electronic stabilizer with single stage conversion to solve low efficiency problem of traditional electronic stabilizers. This object is achieved by changing the location of the converter such that the overall efficiency is increased to be about 84%, which is equal to a single stage conversion. The cost is low and the loss of heat energy is low.

It is another object of the present invention to provide a high-efficient electronic stabilizer with single stage conversion, in which the location of the converter is changed to a secondary winding side (the output side) of the high frequency transformer, thereby providing a single stage conversion between the power input end and the sun lamp and thus having single conversion loss. The overall efficiency is thus improved while using low-cost elements. In addition, the overheating problem is avoided.

It is a further object of the present invention to provide a high-efficient electronic stabilizer with single stage conversion, in which the internal structure thereof is largely changed in addition to the change in the location of the power converter. Two transistors are connected in inverted phase to form a bi-directional impedance converter with a switching frequency that is in synchronization with the push-pull resonant stage. In addition, the bi-directional impedance converter switches at a phase angle adjacent to zero degree (the so-called "zero switching") such that the current passing through the sun lamp approaches sine waves, thereby improving the lighting efficiency. Furthermore, by means of a delicate design of a compensating capacitor, the output voltage and lamp current can be properly compensated to facilitate approaching of sine waves.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
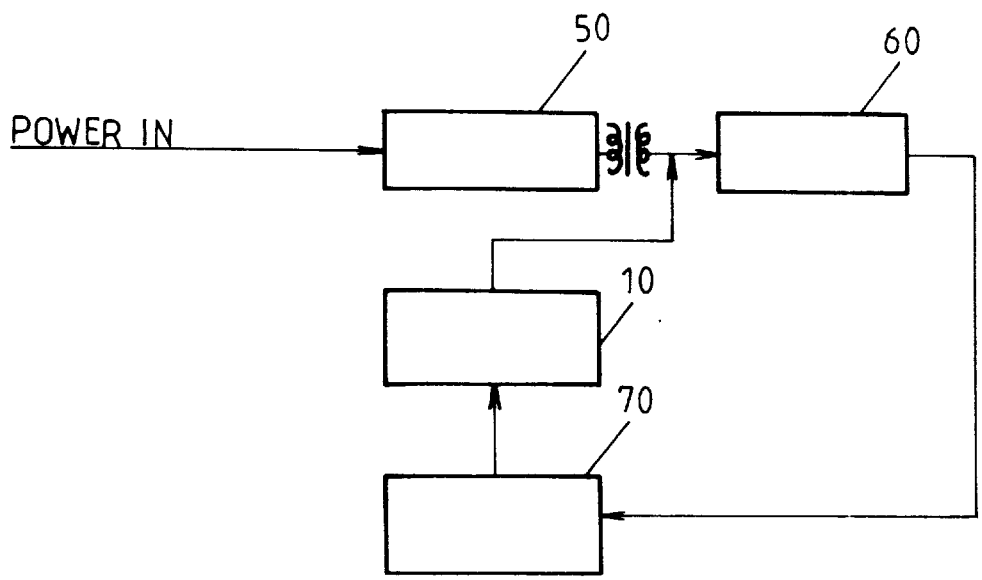
FIG. 1 is a schematic block diagram illustrating a high-efficient electronic stabilizer in accordance with the present invention.
Figure 3:
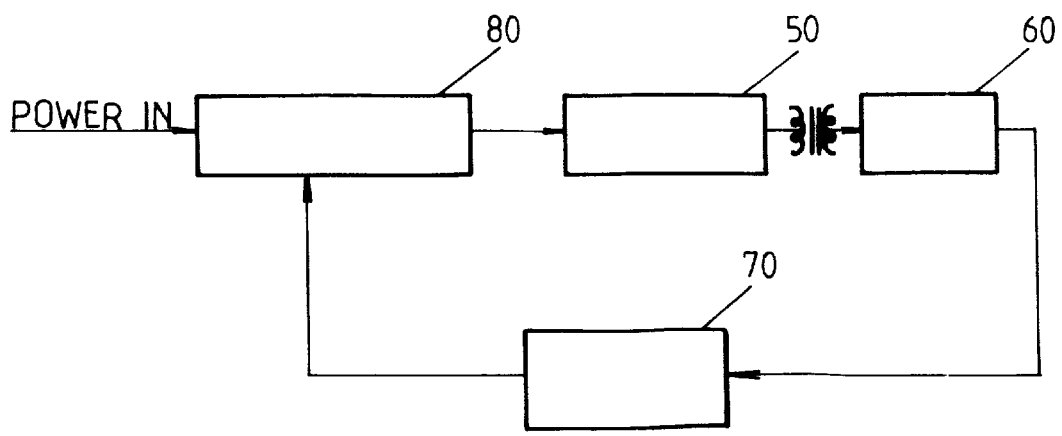
FIG. 3 is a schematic block diagram illustrating a conventional electronic stabilizer.

Referring to FIG. 1 and comparing it with FIG. 3, the power converter 80 in the conventional design shown in FIG. 3 is not used in a high-efficient electronic stabilizer in accordance with the present invention shown in FIG. 1. Instead, the electronic stabilizer in accordance with the present invention comprises a bi-directional impedance converter 10 mounted to a secondary winding side of a transformer where the sun lamp 60 is located. The output of the impedance converter 10 is fed to a corresponding part of the sun lamp 60. The bi-directional impedance converter 10 is not connected to the main loop, and the power input is only connected to the push-pull resonant stage 50. Thus, there is only one stage of energy loss in the push-pull resonant stage 50 between the power input and the sun lamp 60. As a result, the current passing through the bi-directional impedance converter 10 is largely reduced, since the bi-directional impedance converter 10 is located in a loop for the sun lamp 60 through which small current passes. Comparing the structure in FIG. 1 with that in FIG. 3, the cost and the switching loss are both reduced by provision of the stabilizer structure in accordance with the present invention. The efficiency of the bi-directional impedance converter 10 can be as high as 99%, the overall efficiency is about 84% if the efficiency for the push-pull resonant stage 50 is about 85%, which is much higher than that of the conventional design.

In addition, the physical structure of the bi-directional impedance converter is largely different from that of the conventional design. It is not a simple removal of the power converter 80. For example, the traditional power converter 80 operates in a single direction, but the bi-directional impedance converter 10 of the present invention operates in both directions.

Figure 2:
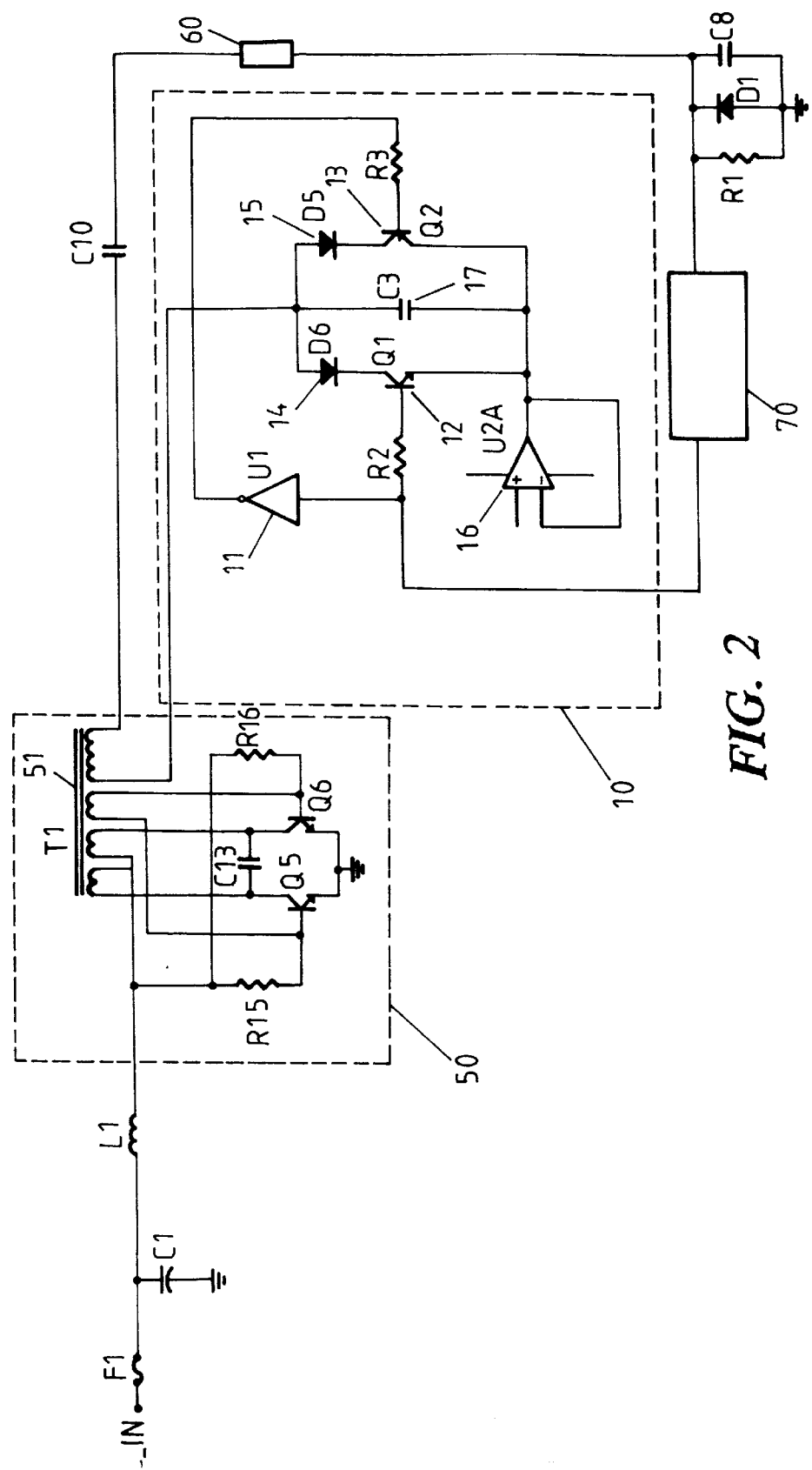
FIG. 2 is a circuit diagram of the high-efficient electronic stabilizer in accordance with present invention.
Figure 4:
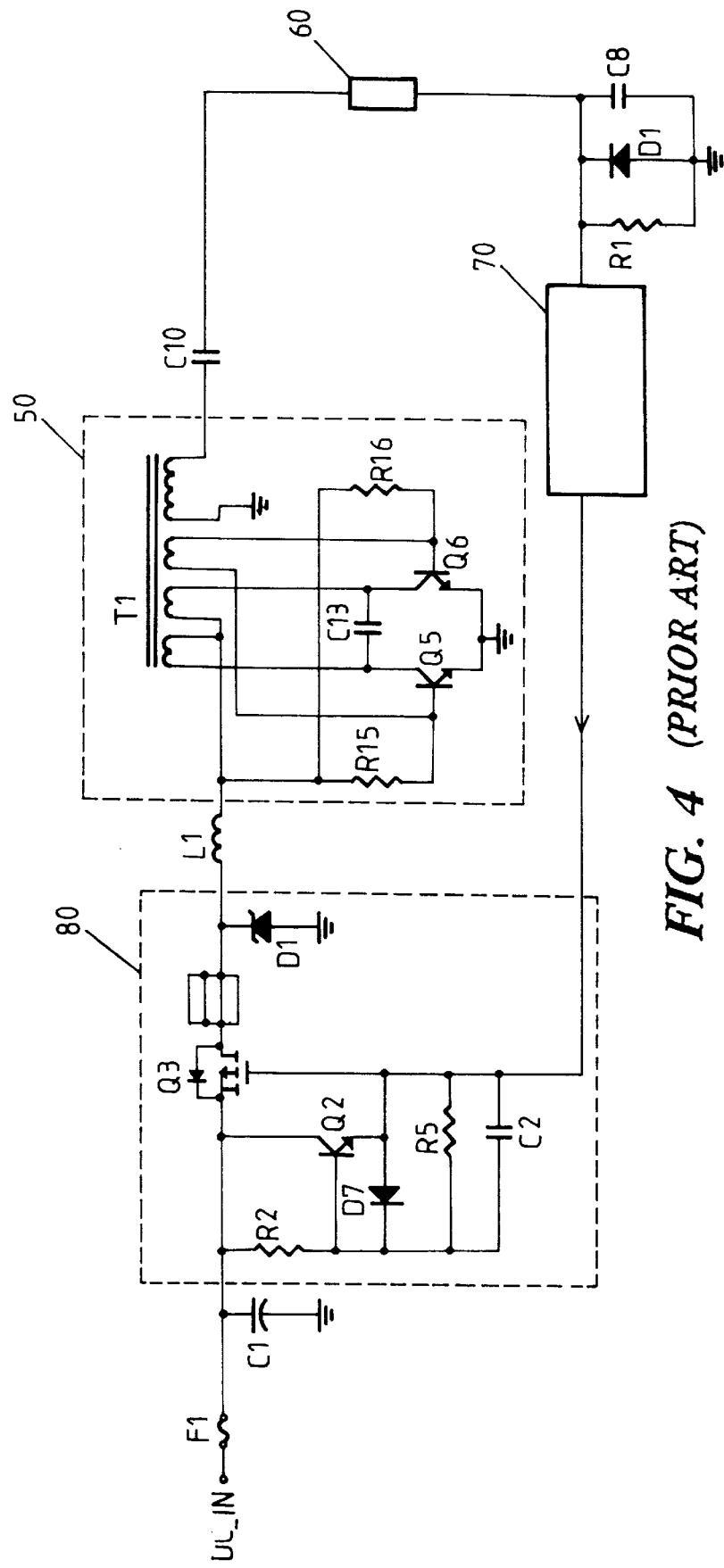
FIG. 4 is a circuit diagram of the conventional electronic stabilizer.

Still referring to FIG. 1 and further to FIG. 2, the push-pull resonant stage 50 in the upper left corner of the diagram and the synchronous pulse width modulation controller 70 in the lower right corner of the diagram 70 are conventional. The main feature of the invention will now be described.

In the bi-directional impedance converter 10, two transistors 12 and 13 and two diodes 14 and 15 are electrically connected in a manner shown in FIG. 2. The base of each transistor 12, 13 is cross-connected to a phase inverter 11 and thus is integrated into an input end. The emitter of each transistor 12, 13 is connected to a voltage source 16. Thus, a converter capable of simultaneously conducting/disconnecting the transistors 12 and 13 and capable of bi-directional operation is provided. A compensating capacitor 17 is cross-connected between the two transistors 12 and 13 for reducing pulse voltage, mitigating distortion in current waves, and making current waves approach sine waves. After the input end of the bi-directional impedance converter 10 is connected to the synchronous pulse width modulation controller 70, the former can proceed with switching operation in response to input pulse waves. In addition, the bi-directional impedance converter 10 may cause a change in the current in response to a change in the pulse width. Upper end (output end) of the bi-directional impedance converter 10 is electrically connected in series to a secondary winding of a high frequency transformer 51 of the push-pull resonant stage 50, such that the bi-directional impedance converter 10 and the sun lamp 60 that is also connected to the secondary winding are connected in series in the same loop. Thus, the same effect for changing the current passing through the sun lamp 60 is achieved by means of serial connection between the bi-directional impedance converter 10 and the sun lamp 60.

As illustrated in FIG. 2, the power supply for the sun lamp 60 is high voltage/low current power under self-activating oscillation of the push-pull resonant stage 50 and after conversion by the high frequency transformer 51. The current for the sun lamp 60 is not supplied via the bi-directional impedance converter 10. The bi-directional impedance converter 10 in this design is a passive, resistant-variable current limiter. Thus, there is only one stage of energy loss (in the push-pull resonant stage 50) between the power input and the sun lamp 60. In addition, the bi-directional impedance converter 10 is connected in a sun lamp loop having small current, the switching loss can be largely reduced. Furthermore, small-current transistors are cheap and the heat energy loss thereof is low. The efficiency of the bi-directional impedance converter 10 can be as high as 99%, the overall efficiency is about 84% if the efficiency for the push-pull resonant stage 50 is about 85%, which is much higher than that of the conventional design.

Although the invention has been explained in relation to its preferred embodiment, it is to be understood that many other possible modifications and variations can be made without departing from the spirit and scope of the invention as hereinafter claimed.

What is claim is:

1. An electronic stabilizer with single stage conversion, comprising:

a push-pull resonant stage including a high frequency transformer and a plurality of transistors to form an alternating voltage-increasing loop that operates under self-activating oscillation, the high frequency transformer including a secondary winding for driving a lamp;

a synchronous pulse width modulation controller for sampling signals from the lamp and feeding back to control a power input for the lamp; and a converter comprising a plurality of transistors to form a dynamic resistance that allows current to flow in both directions, the converter including an input end that is electrically connected to an output end of the synchronous pulse width modulation controller, the converter further including an output end that is electrically connected in series to the secondary winding of the high frequency transformer and in series connection with the lamp;

whereby there is only one stage of energy loss in the push-pull resonant stage between the power input and the lamp.

2. The electronic stabilizer with single stage conversion as claimed in claim 1, wherein the converter and the lamp are connected to different terminals of the high frequency transformer.

3. The electronic stabilizer with single stage conversion as claimed in claim 1, wherein the converter and the lamp are connected to a loop for the lamp.

4. The electronic stabilizer with single stage conversion as claimed in claim 3, wherein the converter comprises two transistors that are electrically connected in parallel, and a phase inverter is cross-connected between a base of one of the transistor and a base of the other transistor.

5. The electronic stabilizer with single stage conversion as claimed in claim 4, further comprising a compensating capacitor electrically cross-connected between the two transistors.

6. The electronic stabilizer with single stage conversion as claimed in claim 1, wherein each said transistor of the converter is electrically connected in series with a diode.

7. The electronic stabilizer with single stage conversion as claimed in claim 4, wherein each said transistor of the converter is electrically connected in series with a diode.

* * * * *